(12) United States Patent
Nylander et al.

(10) Patent No.: US 7,969,864 B2
(45) Date of Patent: Jun. 28, 2011

(54) EARLY SERVICE LOSS OR FAILURE INDICATION IN AN UNLICENSED MOBILE ACCESS NETWORK

(75) Inventors: Tomas Nylander, Varmdo (SE); Jari Tapio Vikberg, Jarna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 494 days.

(21) Appl. No.: 11/577,134

(22) PCT Filed: Oct. 12, 2004

(86) PCT No.: PCT/IB2004/003333
§ 371 (c)(1),
(2), (4) Date: Dec. 19, 2008

(87) PCT Pub. No.: WO2006/040608
PCT Pub. Date: Apr. 20, 2006

(65) Prior Publication Data
US 2009/0116377 A1    May 7, 2009

(51) Int. Cl.
*H04J 1/16* (2006.01)
(52) U.S. Cl. ........ 370/216; 370/224; 455/410; 455/433; 455/435

(58) Field of Classification Search .................. 455/410, 455/433, 435; 370/224
See application file for complete search history.

(56) References Cited

U.S. PATENT DOCUMENTS

| | | | |
|---|---|---|---|
| 2004/0071090 A1* | 4/2004 | Corson et al. | 370/244 |
| 2008/0076386 A1* | 3/2008 | Khetawat et al. | 455/410 |
| 2008/0115009 A1* | 5/2008 | Silfverberg et al. | 714/8 |
| 2008/0293407 A1* | 11/2008 | Cormier et al. | 455/433 |

\* cited by examiner

*Primary Examiner* — David Q Nguyen

(57) ABSTRACT

An Unlicensed Mobile Access Network Controller (UNC) and method for providing an early indication of service failure to a mobile station registered with the UNC. When the UNC detects a network failure that prevents service to the mobile station, the UNC prohibits new registrations by other mobile stations, starts a timer, and monitors the network failure to determine if the failure clears. If the failure clears before the timer expires, new registrations are accepted from other mobile stations. However, if the timer expires before the failure clears, the UNC continues to prohibit new registrations from other mobile stations, and deregisters the mobile station when a network Keep Alive timer expires for the mobile station. When a plurality of mobile stations are registered with the UNC, the UNC deregisters the plurality of mobile stations one at a time as the network Keep Alive timer expires for each mobile station.

10 Claims, 2 Drawing Sheets

EARLY SERVICE LOSS OR FAILURE INDICATION IN AN UNLICENSED MOBILE ACCESS NETWORK

TECHNICAL FIELD OF THE INVENTION

The present invention relates to radio telecommunication systems. In particular, and not by way of limitation, the invention is directed to a system and method for providing a mobile user with an early indication of service loss or service failure in an Unlicensed Mobile Access Network (UMAN).

DESCRIPTION OF RELATED ART

In a traditional cellular system, such as the Global System for Mobile Communications (GSM), a malfunctioning interface from the Base Station Controller (BSC) towards the mobile core network, or malfunctioning internal resources in the BSC, are not signaled towards a mobile station (MS) until the MS attempts a layer 3 procedure such as attempting to make a call. Likewise, the prevention of service is not detected until the MS attempts a layer 3 procedure whenever a network node, for example the BSC or Mobile Switching Center (MSC), is working at a high load and therefore would reject an access attempt. The prevention of service is not detected earlier because the MS is only listening to the information broadcast from base stations in the network, and this information does not change in response to changes in the core network status. Therefore, unless the core network indicates an overload situation to the radio access network, the mobile station may select and lock onto an access network that is unusable.

It would be advantageous to have a system and method that overcomes the disadvantages of the existing methodology by providing an early indication of service loss or service failure to the MS. The present invention provides such a system and method.

SUMMARY OF THE INVENTION

The present invention is a system and method for providing a mobile user with an early indication of service loss or service failure in an Unlicensed Mobile Access Network (UMAN).

Thus in one aspect, the present invention is directed to a method of providing an early indication of service failure to a mobile station registered with an Unlicensed Mobile Access Network Controller (UNC). The method is performed within the UNC and comprises the steps of detecting a network failure that prevents service to the mobile station; determining whether the failure is a short term failure or a persistent failure; and upon determining that the failure is a persistent failure, deregistering the mobile station. The failure may be determined as a short term failure or a persistent failure by starting a timer when the network failure is detected, and determining that the failure is a short term failure if the failure is corrected before the timer expires. The method may also prohibit new registrations by other mobile stations during the time period after the failure is detected and before the failure is corrected.

In another aspect, the present invention is directed to a method of providing an early indication of service failure to a mobile station registered with a UNC. The method is performed within the UNC and comprises the steps of detecting a network failure that prevents service to the mobile station, and upon detecting the network failure, prohibiting new registrations by other mobile stations and starting a timer. The network failure is then monitored to determine if the failure clears. If the failure clears before the timer expires, new registrations are accepted from other mobile stations. However, if the timer expires before the failure clears, the UNC continues to prohibit new registrations from other mobile stations, and deregisters the mobile station when a network Keep Alive timer expires for the mobile station. When a plurality of mobile stations are registered with the UNC, the method includes the step of deregistering the plurality of mobile stations one at a time as the network Keep Alive timer expires for each mobile station.

In yet another aspect, the present invention is directed to a UNC for providing an early indication of service failure to a mobile station registered with the UNC. The UNC includes means for detecting a network failure that prevents service to the mobile station; means for determining whether the failure is a short term failure or a persistent failure; and means responsive to a determination that the failure is a persistent failure, for deregistering the mobile station. After detecting the network failure, the UNC may prohibit new registrations from other mobile stations until the failure clears. When a plurality of mobile stations are registered with the UNC, the UNC deregisters the plurality of mobile stations one at a time as the network Keep Alive timer expires for each mobile station.

DETAILED DESCRIPTION OF EMBODIMENTS

Unlicensed Mobile Access (UMA) technology utilizes an unlicensed radio band to support mobile telecommunication systems operating in licensed radio bands. For example, the Unlicensed Radio service may support GSM circuit-switched services and GSM Packet Radio Service (GPRS) packet-switched services. Access may be provided over unlicensed spectrum technologies such as Bluetooth or Wireless Local Area Network (WLAN) 802.11.

The unlicensed-radio access network enables MSs to communicate with the core network portion of a conventional mobile communications network, such as a GSM network, via an unlicensed-radio interface. The term "unlicensed-radio" means any radio protocol that does not require the operator running the mobile network to have obtained a license from the appropriate regulatory body. In general, such unlicensed-radio technologies must be low power and thus of limited range compared to licensed mobile radio services. A benefit of this lower power is that the battery lifetime of mobile stations is greater. Moreover, because the range is limited the unlicensed-radio may be a broadband radio, thus providing improved voice quality. The radio interface may utilize any suitable unlicensed-radio protocol, for example a wireless LAN protocol, Digital Enhanced Cordless Telecommunications (DECT), or Bluetooth radio.

When a traditional cellular system is extended with other access methods, such as unlicensed radio access networks, uninterrupted services can be provided to the end user (the MS) even if severe problems occur in the core mobile network or in the interface between the unlicensed mobile access network controller (UNC) and the core network. Also since broadband Internet Protocol (IP) networks are used between the access point and the UNC, malfunctions in the IP network or in the voice gateways (used to convert voice/IP to normal Time Division Multiplexed (TDM) signaling that is used towards the core mobile networks) may be detected and should influence which access network the MS uses.

Figure 1:
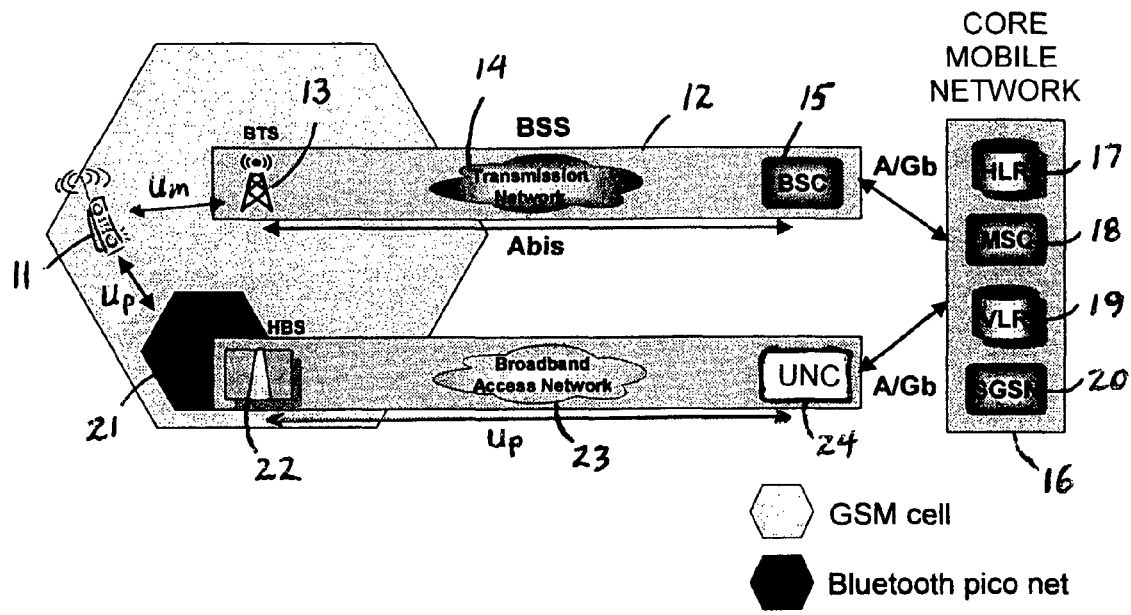
FIG. 1 is a simplified block diagram of an unlicensed-radio access network and a conventional cellular mobile communications network suitable for implementing the present invention.

FIG. 1 is a simplified block diagram of an unlicensed-radio access network and a conventional cellular mobile communications network suitable for implementing the present invention. In an unlicensed radio access network an interface node is needed to aggregate and interconnect to the core mobile network. From the core network point of view, this node is seen as a traditional access network controller node. This type of node is referred to herein as a Home Base Station Controller (HBSC) or Unlicensed Mobile Access Network Controller (UNC) to distinguish it from the traditional cellular system.

In the exemplary embodiment illustrated in FIG. 1, a UMA-enabled, dual-mode mobile station (MS) 11 is operating within the coverage area of a GSM Base Station Subsystem (BSS) 12, which may include a Base Transceiver Station (BTS) 13, a transmission network 14, and a Base Station Controller (BSC) 15. The BSC interfaces with a core mobile network 16, which may include a Home Location Register (HLR) 17, a Mobile Switching Center (MSC) 18, a Visitor Location Register (VLR) 19, and a Serving GPRS Service Node (SGSN) 20. The MS may also access a Bluetooth piconet 21 over an unlicensed radio frequency. The Bluetooth piconet provides access to the core mobile network through an Access Point (AP), which may be any Bluetooth or 802.11 WLAN access point. In FIG. 1, the AP is a Home Base Station (HBS) 22. The HBS communicates through a broadband access network 23 and a UNC 24, which interfaces with the core mobile network 16. The broadband access network may be any type of access network that can carry IP traffic (for example, xDSL, CATV, Ethernet, and the like).

With new alternate access networks that are based on unreliable, unmanaged IP networks, however, there is a need for methods and procedures to control that the mobiles are offered availability as high as that offered by the Cellular network. For this to be the case, the network should have the ability to force the MS to use other access network in case of problems or faults in currently used access network.

In one embodiment of the present invention, the UNC 24 follows the following procedures. If the A-interface (GSM) or Iu interface (WCDMA) towards the core mobile network 16 fails, this indicates a serious fault. For example, it may indicate that the MSC 18 has failed, transmission failed, signaling terminals failed, or the like. When the UNC detects this condition, the UNC starts a timer to filter intermittent faults. While the timer is running, no new mobiles are allowed to connect to or register with the UNC. If the fault clears before the timer expires, it was an intermittent fault, and registrations are again accepted. However, if the fault condition remains after the expiration of the timer, the UNC starts to disconnect MSs currently registered and served by the UNC in order to force the MSs to use another access network. The UNC may also start redirecting the MSs to other access networks, for example to other UNCs.

The UNC 24 performs the same actions when conditions prevail that would prevent successful calls/services, for example in case all voice gateway/media gateway resources are lost, the interface to the SGSN 20 is down, or other internal faults exist. Similar procedures may also be applied in case the UNC is overloaded or has received an indication that the core mobile network 16 is overloaded. In this case, the UNC may either disconnect/redirect MSs until the overload condition ceases, or may disconnect/redirect MSs when they attempt a layer 3 procedure, and the overload condition still exists. The MS may then connect to a UNC that is less loaded or to a UNC that is connected to a MSC that is less loaded. If no alternative UNC/MSC is found, the MS may attach to the cellular network.

In UMA networks, all MSs register at the UNC, thereby creating an MS context that remains in the UNC until the MS is either deregistered by the UNC, roved out (e.g., roam out or walk-away), or redirected to another UNC. When a failure is detected, the UNC should deregister or redirect the MSs as early as possible so that the MSs is deregistered or redirected before the MS actively tries to make a call and detects that service is unavailable.

The number of registered MSs in a UNC can be up to tens or hundreds of thousands, so de-registrations and redirections need to be distributed over time so that the GSM core network is not overloaded with a large number of Location Updates at the same time (if the UNC and alternative GERAN network belong to different Location Areas).

Figure 2:
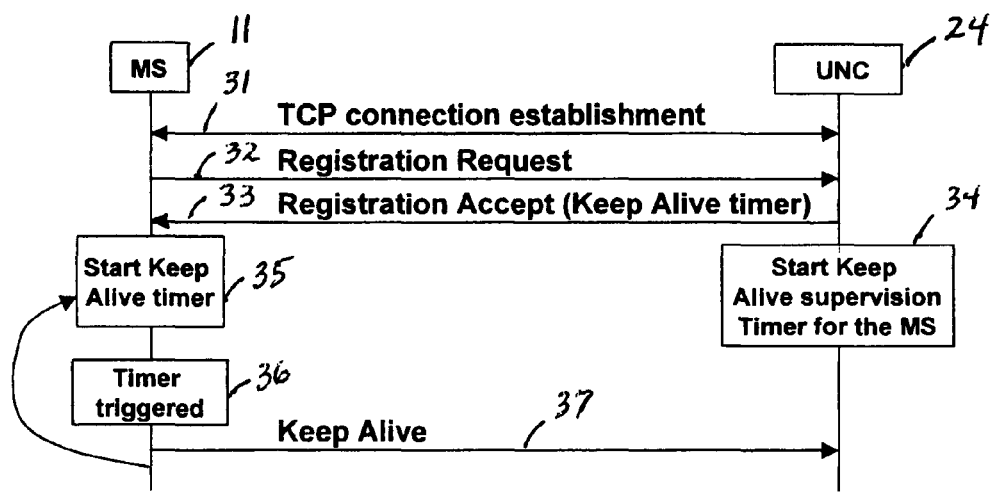
FIG. 2 is a signaling diagram illustrating the flow of signaling messages in a first exemplary embodiment of the present invention.

FIG. 2 is a signaling diagram illustrating the signaling messages between the MS 11 and the UNC 24 when performing a Network Controlled Keep Alive procedure. All MSs registered with the UNC 24 perform the Keep Alive procedure. At step 31, a Transmission Control Protocol (TCP) connection is established through the broadband access network 23 (FIG. 1) between the MS and the UNC. At step 32, the MS sends a Registration Request message to the UNC. At step 33, the UNC returns a Registration Accept message to the MS, and then starts a Keep Alive supervision timer at 34 for this particular MS. The Registration Accept message includes a predefined time interval for setting an MS Keep Alive timer. When the MS receives the Registration Accept message, the MS starts its Keep Alive timer at step 35 and sets the timer for the interval defined in the Registration Accept message. Each registered MS periodically sends a Keep Alive message to the UNC at a predefined interval such as every 10 minutes. Therefore, when the MS Keep Alive timer is triggered at 36, the MS sends a Keep Alive message to the UNC at 37, and restarts the MS Keep Alive timer. The UNC supervises the receipt of Keep Alive messages, and if a Keep Alive message is not received from a particular MS, the UNC may deregister the MS.

Figure 3:
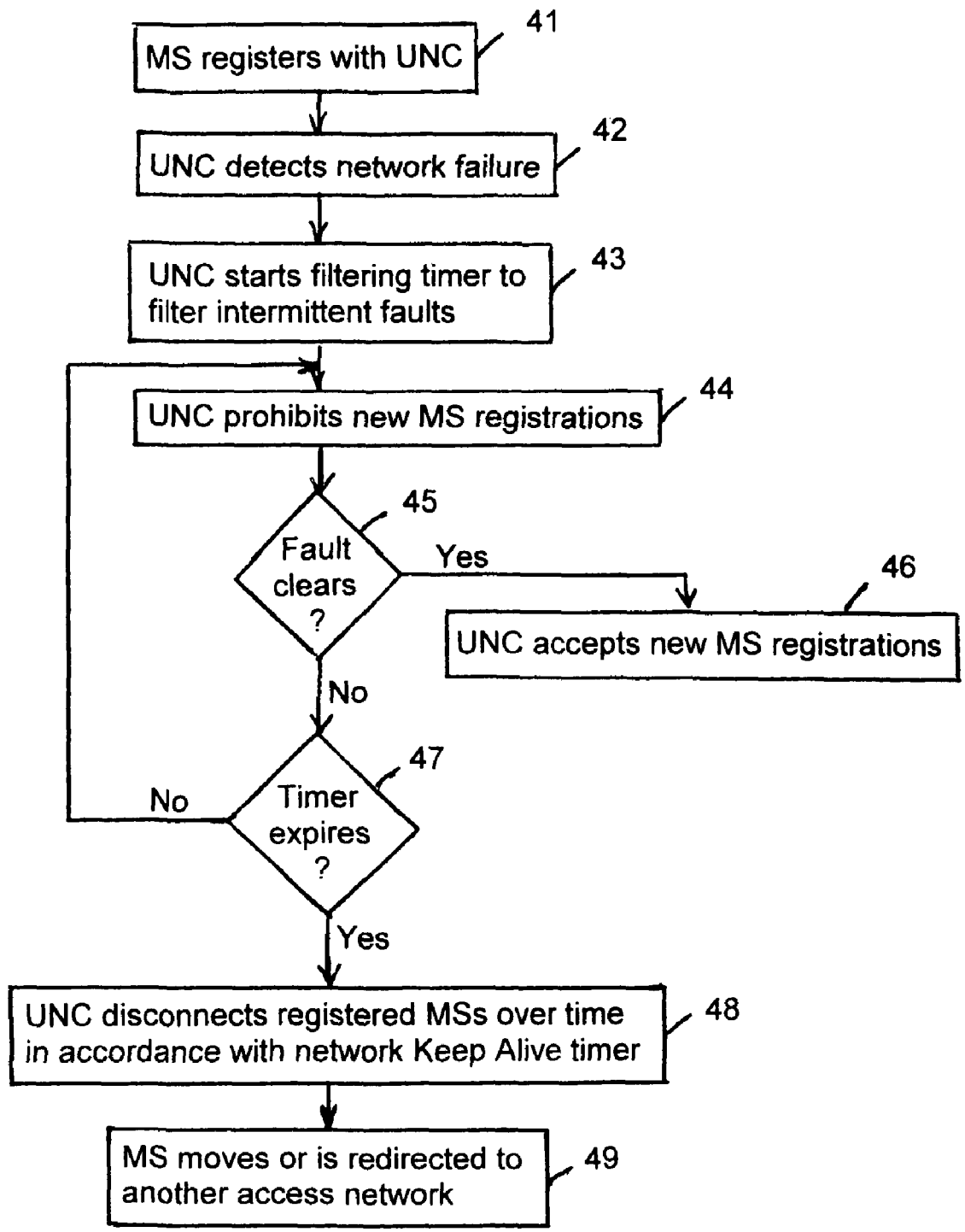
FIG. 3 is a flow chart illustrating the steps of an embodiment of the method of the present invention.

FIG. 3 is a flow chart illustrating the steps of an embodiment of the method of the present invention. At step 41, the MS 11 registers with the UNC 24. At step 42, the UNC detects a fault or system failure that prevents service for the MSs that are registered with the UNC. At step 43, the UNC starts a filtering timer to determine whether the fault is an intermittent fault or a persistent fault. At step 44, the UNC prohibits all new registrations from MSs while the filtering timer is running. At step 45, the UNC determines whether the fault has cleared. If so, the fault was an intermittent fault, and the method moves to step 46 where the UNC resumes accepting registrations from MSs. However, if the fault has not cleared at step 45, the method moves to step 47 where the UNC determines whether the filtering timer has expired. If not, the method returns to step 44 where the UNC continues to prohibit new MS registrations.

However, if the filtering timer has expired, and the fault has not cleared, the fault is a persistent fault, and the method moves to step 48 where the UNC begins to deregister (or redirect) the registered MSs using the Keep Alive supervision timer in the UNC to distribute the de-registrations in time.

Thus, the UNC does not deregister all MSs at once. Instead, the UNC waits for the network Keep Alive supervision timer to trigger for each MS. The network Keep Alive timer triggers at a different time for each MS because the network Keep Alive timer is initiated for each MS when the MS initially registers with the UNC.

After the MS is deregistered, the method moves to step 49 where the MS may search and find another access network such as a GSM EDGE Radio Access Network (GERAN), or the MS may be redirected to another UNC, based on fault type and operator policy.

The description above has been mainly focusing on the UMA case. The same principle is also applicable for licensed mobile networks such as GERAN and WCDMA networks. The main difference is that in these mobile networks, there is no idle mode context in the radio access networks for MSs using these cells. Therefore, when the radio access network controller (e.g. BSC or RNC) detects faults that would prevent service for the MSs, the controller may indicate in the broadcast system information that the current cell is bad, and the MS should search for another cell. Examples of the system information that could be used include an indication in the Access Control Class bits that MSs belonging to a specific Access Class are not allowed to access the cell. This information may also be used in the UMA case. Alternatively, the system information may indicate that the cell is barred, or may indicate in the Cell Selection parameters (e.g. CELL-RESELECT-HYSTERESIS or RXLEV ACCESS-MIN) that the MS should not select the current cell. Finally, the BSC or RNC may simply turn off the Broadcast Control Channel (BCCH) making the whole cell 'disappear'.

Those skilled in the art will readily appreciate that the present invention may be implemented using either hardware, or software, or both, and further, software implementations may vary using different languages and data structures. The present invention is not limited to a specific language and/or class of languages, nor is it limited to any single data structure implantation.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of providing an early indication of service failure to a mobile station registered with an Unlicensed Mobile Access Network Controller (UNC), said method being performed within the UNC and comprising the steps of:
   detecting a network failure that prevents service to the mobile station;
   upon detecting the network failure:
      prohibiting new registrations by other mobile stations; and
      starting a timer;
   monitoring the network failure to determine if the failure clears;
   if the failure clears before the timer expires, accepting new registrations by mobile stations;
      if the timer expires before the failure clears:
         continuing to prohibit new registrations by other mobile stations: and
         deregistering the mobile station when a network Keep Alive timer expires for the mobile station.

2. The method of claim 1, wherein a plurality of mobile stations are registered with the UNC, and the step of deregistering the mobile station includes deregistering the plurality of mobile stations one at a time as the network Keep Alive timer expires for each mobile station.

3. The method of claim 1, further comprising redirecting the deregistered mobile station to another access network.

4. An Unlicensed Mobile Access Network Controller (UNC) for providing an early indication of service failure to a mobile station registered with the UNC, said UNC comprising:
   detector means for detecting a network failure that prevents service to the mobile station;
   means for prohibiting new registrations by other mobile stations and starting a timer when the detector means detects the network failure;
   a monitor function for monitoring the network failure to determine if the failure clears, wherein if the failure clears before the timer expires,
      means for accepting new registrations by mobile stations or if the timer expires before the failure clears,
      means for continuing to prohibit new registrations by other mobile stations; and
   means for deregistering the mobile station when a network Keep Alive timer expires for the mobile station.

5. The UNC of claim 4, wherein the means for determining whether the failure is a short term failure or a persistent failure includes:
   a timer for measuring a filtering time period, said timer being started when the network failure is detected;
   means for monitoring the network failure to determine if the failure clears: and
   means for determining that the failure is a short term failure if the failure clears before the filtering time period expires.

6. The UNC of claim 5, further comprising means for prohibiting new registrations by mobile stations during a time period after the failure is detected and before the failure is corrected.

7. The UNC of claim 6, further comprising means for accepting new registrations by mobile stations if the timer has not expired and the failure has been corrected.

8. The UNC of claim 4, wherein the means for deregistering the mobile station includes:
   a network Keep Alive timer that measures a Keep Alive time period for each mobile station registered with the UNC; and
   means for deregistering the mobile station when the network Keep Alive timer expires for the mobile station.

9. The UNC of claim 4, wherein a plurality of mobile stations are registered with the UNC1 and the means for deregistering the mobile station includes means for deregistering the plurality of mobile stations one at a time over a period of time.

10. The UNC of claim 9, wherein the means for deregistering the plurality of mobile stations one at a time over a period of time includes:
   a network Keep Alive timer that measures a Keep Alive time period for each mobile station registered with the UNC; and
   means for deregistering each mobile station when the network Keep Alive timer expires for each mobile station.

\* \* \* \* \*

UNITED STATES PATENT AND TRADEMARK OFFICE
CERTIFICATE OF CORRECTION

| | |
|---|---|
| PATENT NO. | : 7,969,864 B2 |
| APPLICATION NO. | : 11/577134 |
| DATED | : June 28, 2011 |
| INVENTOR(S) | : Nylander et al. |

Page 1 of 1

It is certified that error appears in the above-identified patent and that said Letters Patent is hereby corrected as shown below:

In Column 5, Line 63, in Claim 1, delete "stations:" and insert -- stations; --, therefor.

In Column 6, Line 32, in Claim 5, delete "clears:" and insert -- clears; --, therefor.

In Column 6, Line 51, in Claim 9, delete "UNC1" and insert -- UNC, --, therefor.

Signed and Sealed this
Fifteenth Day of November, 2011

David J. Kappos
*Director of the United States Patent and Trademark Office*